(12) United States Patent
Lee et al.

(10) Patent No.: US 10,180,767 B2
(45) Date of Patent: Jan. 15, 2019

(54) PORTABLE DEVICE AND METHOD FACILITATING EXECUTION OF MULTIPLE APPLICATIONS SIMULTANEOUSLY

(71) Applicant: Samsung Electronics Co., Ltd., Gyeonggi-do (KR)

(72) Inventors: Jaekyung Lee, Gyeonggi-do (KR); Youngkyoo Kim, Seoul (KR); Dongho Jang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 411 days.

(21) Appl. No.: 14/190,350

(22) Filed: Feb. 26, 2014

(65) Prior Publication Data

US 2014/0245203 A1  Aug. 28, 2014

(30) Foreign Application Priority Data

Feb. 26, 2013  (KR) ........................ 10-2013-0020428

(51) Int. Cl.
*G06F 3/0481* (2013.01)
*G06F 3/0486* (2013.01)
*G06F 3/0488* (2013.01)
*G06F 9/445* (2018.01)
*G06F 3/048* (2013.01)
*G06F 3/0484* (2013.01)

(52) U.S. Cl.
CPC .......... *G06F 3/04817* (2013.01); *G06F 3/048* (2013.01); *G06F 3/0486* (2013.01); *G06F 3/04845* (2013.01); *G06F 3/04883* (2013.01); *G06F 9/445* (2013.01); *G06F 2203/04803* (2013.01)

(58) Field of Classification Search
CPC ..... G06F 9/4443; G09G 5/14; H04N 5/44591
USPC ........................................................ 715/765
See application file for complete search history.

(56) References Cited

U.S. PATENT DOCUMENTS 8,149,335 B2    4/2012  Sudo et al.
9,658,732 B2 *  5/2017  Ording ................. G06F 9/4443
2005/0108655 A1* 5/2005 Andrea ................... G06F 9/451
                                                          715/798

(Continued)

FOREIGN PATENT DOCUMENTS

CN    101106621 A    1/2008
CN    102298490 A   12/2011

(Continued)

OTHER PUBLICATIONS

European Search Report dated Jun. 8, 2017.
Chinese Search Report dated Nov. 28, 2017.

*Primary Examiner* — Joy M Weber
(74) *Attorney, Agent, or Firm* — Cha & Reiter, LLC

(57) ABSTRACT

A portable device which simultaneously executes a plurality of applications by using a multi-screen and a method of operating a multi-application thereof. The method involves receiving an input according to a user selection of a multi-application icon for executing a plurality of applications in respective windows simultaneously. Based on the selected multi-application icon, the applications and respective windows are identified. Execution images respectively associated with the applications are then displayed on the windows simultaneously.

18 Claims, 12 Drawing Sheets

(56) References Cited

U.S. PATENT DOCUMENTS

| | | | |
|---|---|---|---|
| 2005/0177796 A1 | 8/2005 | Takahashi | |
| 2006/0200779 A1* | 9/2006 | Taylor | G06F 3/0481 |
| | | | 715/781 |
| 2008/0016520 A1 | 1/2008 | Kong | |
| 2010/0058182 A1* | 3/2010 | Jung | G06F 3/04883 |
| | | | 715/702 |
| 2010/0248788 A1* | 9/2010 | Yook | G06F 3/0481 |
| | | | 455/566 |
| 2010/0313154 A1* | 12/2010 | Choi | G06F 3/0219 |
| | | | 715/765 |
| 2011/0320977 A1 | 12/2011 | Bahn et al. | |
| 2012/0144293 A1* | 6/2012 | Kim | G06F 3/0488 |
| | | | 715/255 |
| 2012/0240071 A1 | 9/2012 | Park | |
| 2012/0274581 A1 | 11/2012 | Kim | |
| 2013/0002524 A1 | 1/2013 | Sirpal et al. | |
| 2013/0038636 A1* | 2/2013 | Fujiwaka | G06F 1/1643 |
| | | | 345/681 |
| 2013/0187861 A1* | 7/2013 | Lavallee | G06F 9/543 |
| | | | 345/173 |
| 2014/0317544 A1 | 10/2014 | Wang | |

FOREIGN PATENT DOCUMENTS

| | | |
|---|---|---|
| CN | 102799357 A | 11/2012 |
| CN | 102859483 A | 1/2013 |
| EP | 2 372 516 A2 | 10/2011 |
| KR | 10-2012-0061694 A | 6/2012 |

\* cited by examiner

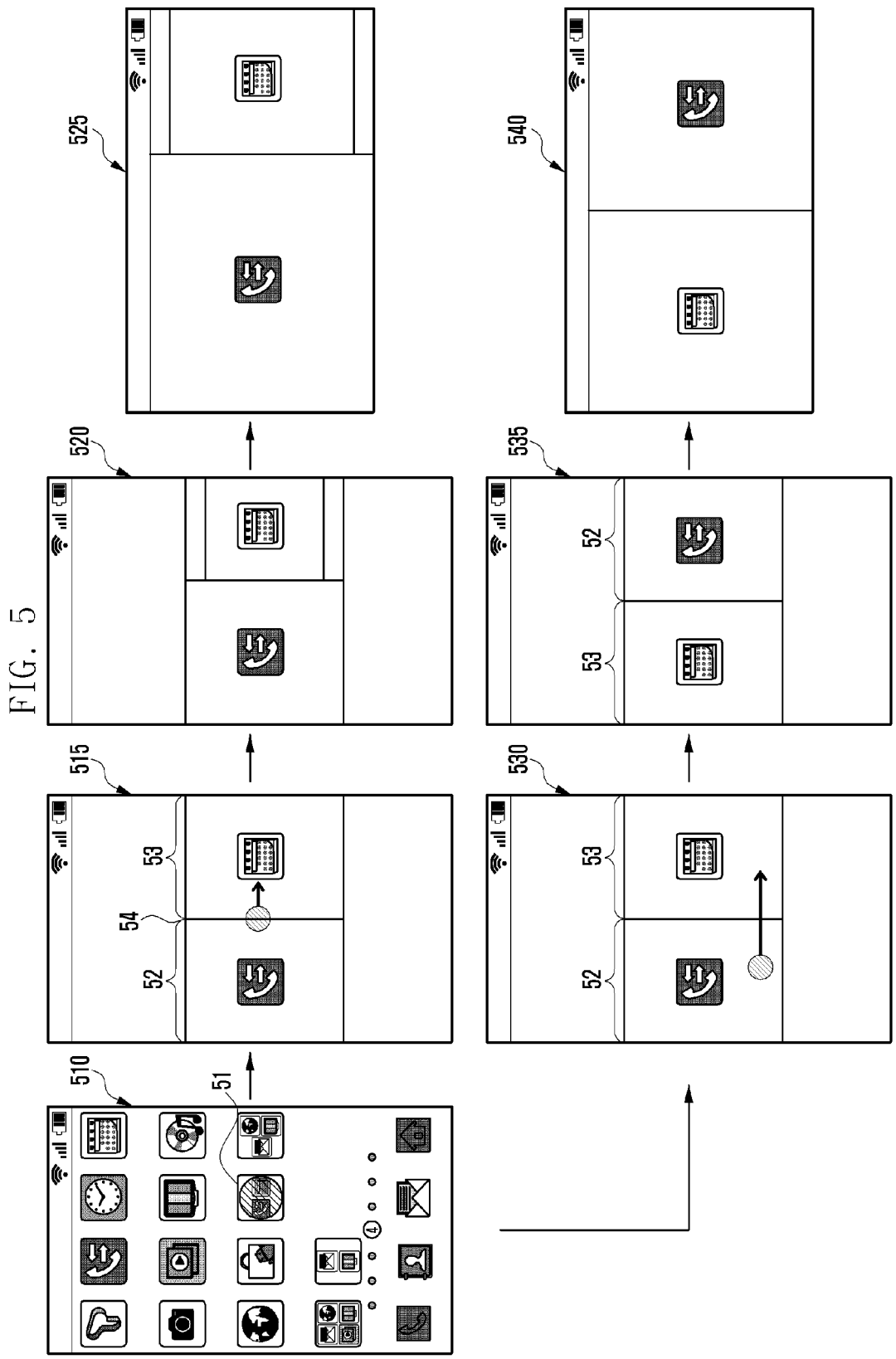

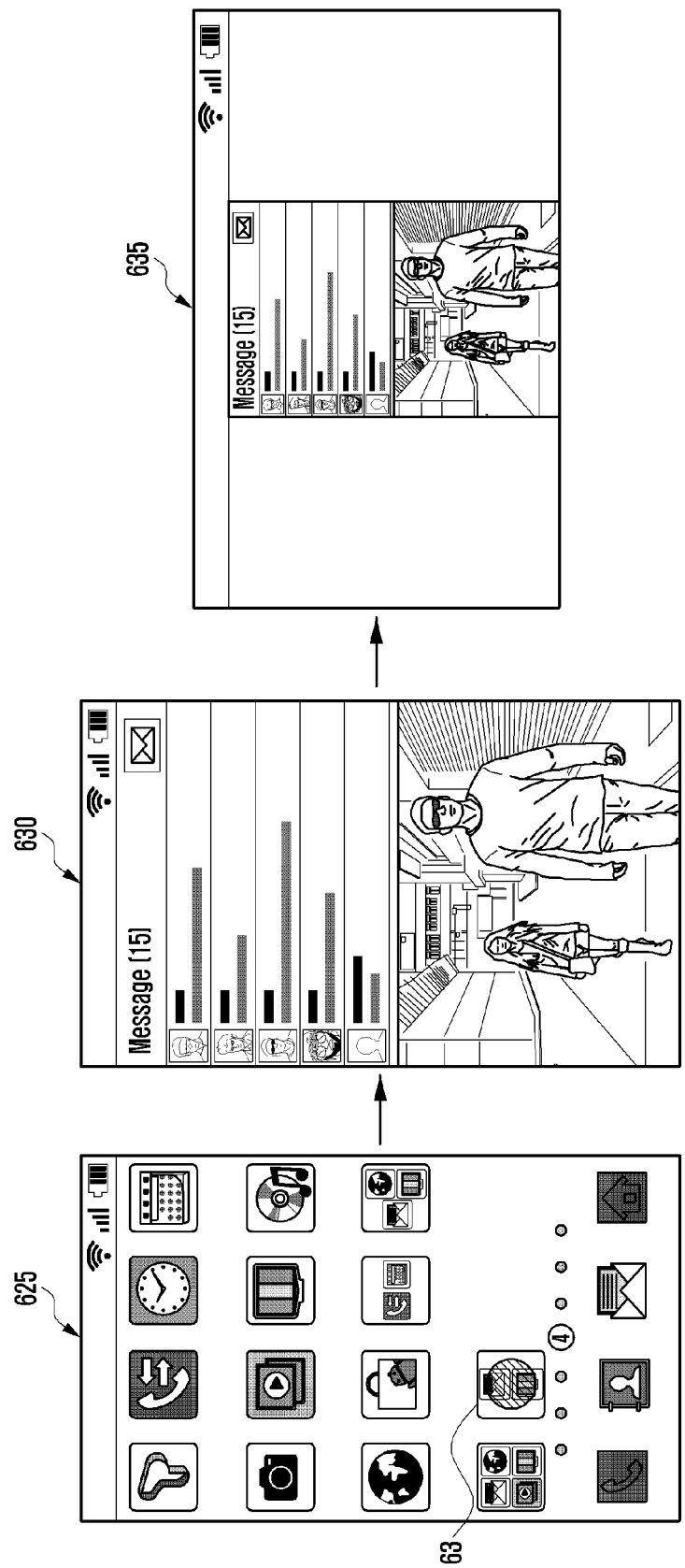

PORTABLE DEVICE AND METHOD FACILITATING EXECUTION OF MULTIPLE APPLICATIONS SIMULTANEOUSLY

CLAIM OF PRIORITY

This application claims the benefit under 35 U.S.C. § 119(a) of a Korean patent application filed on Feb. 26, 2013 in the Korean Intellectual Property Office and assigned Serial No. 10-2013-0020428, the entire disclosure of which is hereby incorporated by reference.

TECHNICAL FIELD

The present disclosure relates generally to portable electronic devices, and more particularly, to a method of operating a multi-application thereof in which a plurality of applications are executed simultaneously with a multi-screen display technique.

BACKGROUND

Today's portable devices such as smartphones and tablets provide a variety of functions such as telephony, photography of still images and/or moving images (video), broadcast reception, and Internet connection. A portable device typically displays an execution screen of a single application at any given time due to restriction of the size of the screen and performance.

In recent designs, the screen size of portable devices has been trending larger, and performance is rapidly improving. With the larger screen, some recent portable devices are configured to simultaneously execute a plurality of applications by using a "multi-screen" display technique, also known as "multi window", in which different portions of the overall screen display execution images of different respective applications. In order to implement a multi-screen display, the user first inputs a predetermined command to activate a multi-screen mode, and thereafter the user selects a plurality of applications to be executed in divided screens after activating the multi-screen mode. Thus, in order to execute a plurality of applications on a multi-screen of a desired form, the portable device user is required to input a series of commands, which may be burdensome for some users.

Hence, there is a need to provide a simplified user interface which allows for easier execution of a plurality of applications in a multi-screen in a form which is desired by the user.

SUMMARY

Embodiments described herein provide a portable device capable of easily executing a plurality of applications in a multi-screen of a form which is desired by a user, and a method of operating a multi-application of the portable device.

The present disclosure further provides a portable device capable of generating a "multi-application icon" which, when selected, causes rapid launching of multiple applications (a "multi-application") in a multi-screen display mode. The multi-application icon may be generated combining icons corresponding to a plurality of applications. Methods for editing and updating the multi-application icon are also described.

In accordance with an aspect of the present disclosure, a method of operating a multi-application of a portable device is provided. The method involves receiving an input according to a user selection of a multi-application icon for executing a plurality of applications in respective windows simultaneously. Based on the selected multi-application icon, the applications and respective windows are identified. Execution images respectively associated with the applications are then displayed on the windows simultaneously.

In accordance with another aspect of the present disclosure, a portable device includes a touch screen to receive an input according to a user selection of a multi-application icon for executing a plurality of applications in respective windows simultaneously. A controller controls operations of identifying the applications and the windows respectively for the applications based on the selected multi-application icon, and displaying execution images respectively associated with the applications on the windows simultaneously.

BRIEF DESCRIPTION OF THE DRAWINGS

The aspects, features and advantages of the present disclosure will be more apparent from the following detailed description in conjunction with the accompanying drawings, in which:

FIG. 5 illustrates an example of a method of editing a multi-icon according to an embodiment of the present disclosure;

FIG. 6B illustrates an example of executing a multi-icon according to an embodiment of the present disclosure;

DETAILED DESCRIPTION

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

A portable device described hereinafter is a device configured to provide a screen division function. Examples of the portable device include but are not limited to a mobile communication terminal, a smartphone, a tablet personal computer (PC), a hand-held PC, a portable multimedia player (PMP), a personal digital assistant (PDA), and a notebook PC. Further, hereinafter, the present disclosure will be described using the portable device as an example.

However, the present disclosure may be applicable to larger devices such as a smart TV, a desktop PC, etc. which may execute a plurality of applications using a multi-screen.

Herein, a "multi-screen" is a screen divided into different windows (or "divided screens"). In the multi-screen, a plurality of images (still images and/or video) generated by different applications are concurrently displayed in the respective windows. Herein, "image" refers to any visual information, such as graphics, text, etc.

Hereinafter, a "multi-application icon" (equivalently called "multi-icon" for brevity) is an icon for simultaneously launching a plurality of applications so as to generate images displayed through the multi-screen. If an execution command of the multi-icon is inputted, e.g., by touching the multi-icon, the plurality of applications are executed through the multi-screen. To this end, a plurality of applications and screen division information are mapped to the multi-icon. The screen division information is information for displaying the images of the plurality of applications on the multi-screen, and includes information of locations where images of respective applications are displayed, and the size information of each divided screen. The screen division information is set to default screen division information which is previously set according to the number of the plurality of applications at the time of generating the multi-icon, and may be edited and updated later.

The multi-icon may be generated by combining icons of the plurality of applications. The location and size of the icons of the plurality of applications included in the multi-icon are variable according to the screen division information. As such, the user may recognize in advance the structure (form or layout) of the multi-screen when a plurality of applications are executed through selection of the multi-icon.

Herein, the term "multi-application" is used to refer to simultaneous execution of multiple applications, where each application generates an image or video displayed on a respective portion (division) of the overall screen.

Figure 1:
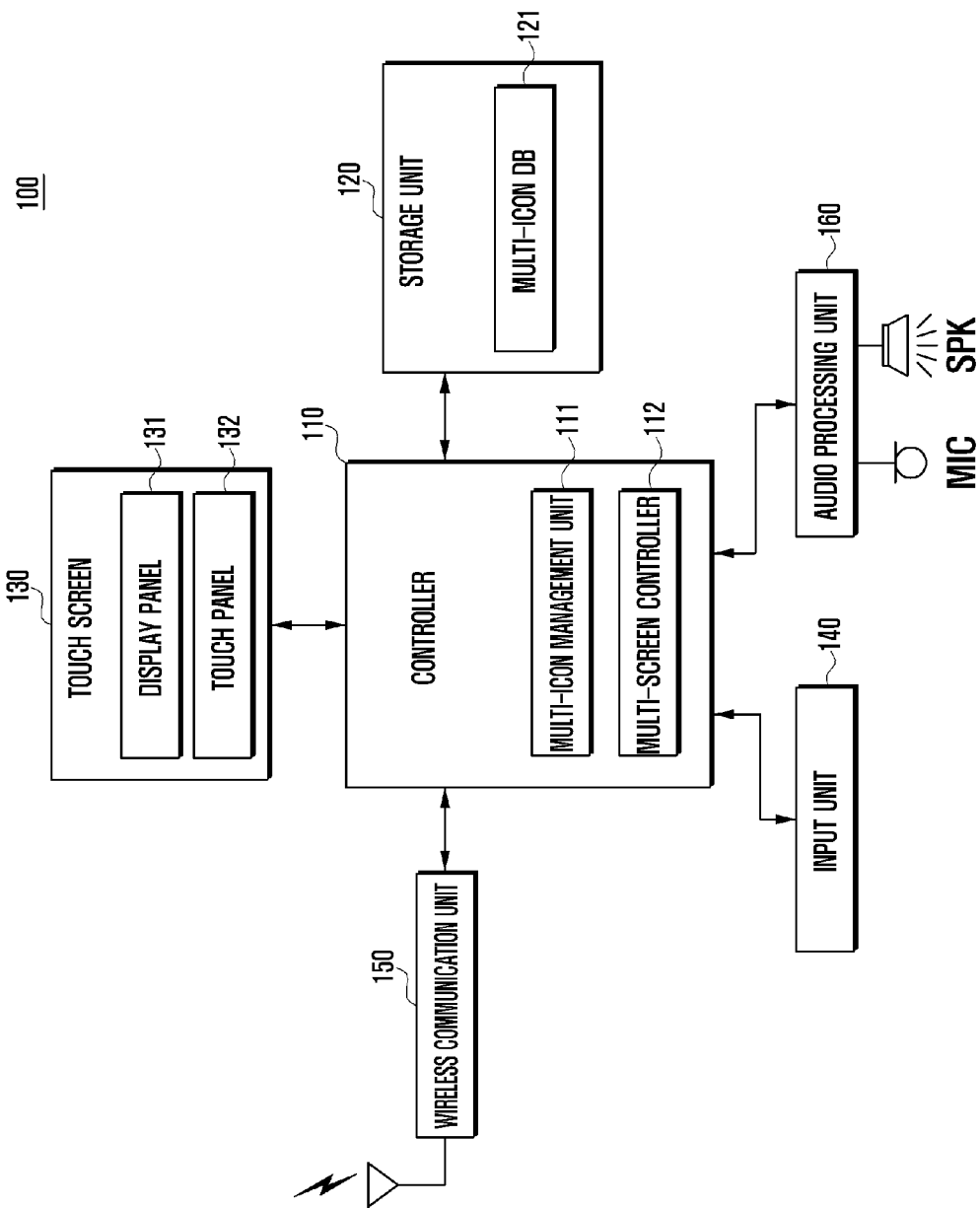
FIG. 1 is a block diagram illustrating a configuration of a portable terminal according to an embodiment of the present disclosure.

FIG. 1 is a block diagram illustrating a configuration of a portable device, 100, according to an embodiment of the present disclosure. Device 100 includes a controller 110, a storage unit 120, a touch screen 130, an input unit 140, a wireless communication unit 150, and an audio processing unit 160. The touch screen 130 may include a display panel 131 and a touch panel 132; the storage unit 120 may include a multi-icon database (DB) 121; and the controller 110 may include a multi-icon management unit 111 and a multi-screen controller 112.

Portable device 100 may execute a plurality of applications mapped to the multi-icon at the time of the execution request of the multi-icon. Such execution involves dividing the screen according to the screen-division information mapped to the multi-icon, and outputting the plurality of executed applications on the divided screen (i.e., concurrently displaying respective images generated by the executed applications). Further, device 100 may support the function of generating, editing, and updating the multi-icon. Hereinafter, each component of device 100 for supporting the above-noted functions will be described.

The audio-processing unit 160 may be connected to speaker (SPK) for outputting an audio signal which is transmitted and received at the time of calling, an audio signal included in the received message, an audio signal according to the replay of the audio file stored in the storage unit 120, etc., and a microphone (MIC) for collecting user's voice or other audio signals. The audio processing unit 160 according to the present disclosure may output a sound effect corresponding to the generation, editing, updating and execution of the multi-icon under control of the controller 110. Further, to prevent confusion caused by simultaneous audio output by different sources, the audio processing unit 160 may output only some audio signals among a plurality of applications when a plurality of applications are executed on the multi-screen according to the execution of the multi-icon. For example, the audio processing unit 160 may output only the audio signal of a specific application (e.g., an application which is displayed in the largest part of the divided screen or an application which is displayed in a predetermined location) or the audio signal of the entire application depending on the user's selection.

The wireless communication unit 150 supports the wireless communication function of the portable device 100, and may include a mobile communication module when the portable device 100 supports the mobile communication function (e.g., 3G or 4G voice/data communication function). The wireless communication unit 150 may include a radio frequency (RF) transmission unit (not shown) which up-converts and amplifies the frequency of the transmitted signal and an RF reception unit (not shown) which low-noise-amplifies the received signal and down-converts the frequency. In particular, the wireless communication unit 150 according to the present disclosure may transmit data representing the multi-icon ("transmit the multi-icon") to another portable device or server (not shown), or receive the multi-icon from another portable device or server. That is, the present disclosure may share the multi-icon with another user.

The input unit 140 may include a plurality of input keys and function keys for receiving an input of number or character information and setting various functions. The function keys may include a direction key, a side key, and a shortcut key which are set to perform a specific function. Further, the input unit 140 generates a key signal related with the function control of the user setting and function control of the portable device 100, and transmits the key signal to the controller 110. The input unit 140 may be formed as one or a combination of input units such as a qwerty keypad, a 3*4 keypad, 4*3 keypad, a ball joystick, an optical joystick, a wheel key, a touch key, a touch pad, and a touch screen. In other embodiments, the input unit 140 may include only some function keys such as a volume key, a power key, a menu key, a cancel key, and a home key when the portable device 100 supports the full touch screen. In particular, the input unit 140 according to the present disclosure may generate an input signal for activating a multi-icon generation mode, an input signal for activating a multi-icon editing mode, an input signal for requesting execution of the multi-icon, an input signal for requesting a change of screen division information (location and size of each divided screen), an input signal for requesting storage of the changed screen division information, an input signal for requesting generation of the multi-icon, and an input signal for inputting the name of the multi-icon. The input unit 140 provides the generated input signal to the controller 110.

The touch screen 130 may perform an input function and a display function. To this end, the touch screen 130 may include a display panel 131 and a touch panel 132.

The display panel 131 displays information which is inputted by the user or information which is to be provided to the user as well as various menus of the portable device 100. For example, the display panel 131 may provide various screens according to the use of the portable device 100, such as a home screen, a menu screen, a text-message writing screen, a received and/or transmitted text message display screen, a web page screen, and a calling screen. The display panel 131 may be formed as a liquid crystal display (LCD), an organic light emitted diode (OLED), an active matrix organic light emitted diode (AMOLED), etc. In particular, the display panel 131 according to the present disclosure may display a multi-screen according to execution of the multi-icon. Further, the display panel 131 may display a screen of generating the multi-icon and the screen of editing the multi-icon. Exemplary display screens generated by display panel 131 will be described in detail later with reference to FIGS. 3A to 8.

The touch panel 132 is a device for providing an input function, and, when a touch input means such as the user's finger, a stylus, or an electronic pen contacts or approaches the touch panel 132, the touch panel 132 may generate a touch event and transmit the generated touch event to the controller 110. In detail, the touch panel 132 may recognize generation of a touch event through a change of a physical quantity (e.g., a capacitance, resistance, etc.) according to the contact or approach of the touch input means, and transmit the type of the generated touch event (e.g., a tap, a touch movement such as a drag and a flick, a long touch, a double touch, etc.) and touched location information to the controller 110. Touch panels are known to those of ordinary skill in the art, and thus the detailed description of touch panel 132 will be omitted here. In particular, touch panel 132 according to the present disclosure may generate a touch input signal for operating the function of generating and editing the multi-icon, a touch input signal for requesting execution and termination of the multi-icon, and a touch input signal for changing screen division information (location and size) of the multi-screen, and transmit the generated touch input signal to the controller 110.

The storage unit 120 may store the operating system (OS) of the portable device 100, application programs which are needed for other optional functions such as a sound replay function, an image or moving-image replay function, a broadcast replay (TV) function, an Internet connection function, and a text message function, and user data, and transmitted and received data. For example, the storage unit 120 may store a moving-image file, a game file, a music file, and a movie file. In particular, the storage unit 120 according to the present disclosure may include a multi-icon database (DB) 121 as shown in Table 1 below.

casting (DMB) application are simultaneously executed; and images generated by these applications are set to be respectively displayed on the multi-screen which is divided by 1:1 in a horizontal direction (denoted by "width"). Further, when the multi-icon "text TV" is selected, the text message application and the DMB application are simultaneously executed, and the images generated by the text message application and the DMB application are set to be respectively displayed on the multi-screen which is divided by 2:1 in a vertical direction (denoted by "length"). (That is, the screen portion for text messaging is twice as long as the screen portion allocated for TV.) Further, in the multi-icon "text Internet TV", the text message application, the web browser application, and the DMB application are simultaneously executed, and the text message application, the web browser application, and the DMB application are set to be respectively displayed on the multi-screen which is divided by 1:1 in a horizontal direction and in which the divided left screen is divided by 2:1 in a vertical direction. Of course, Table 1 is merely an example to explain concepts of the disclosure, and the embodiments of the present disclosure are not limited thereto.

The storage unit 120 may store default screen division information according to the number of icons. For example, when a multi-icon is generated by combining two icons, the default screen division information divides the screen by 1:1 in a horizontal direction, and the icons are set to be displayed from left to right on the basis of the selection order of the icons. When the three icons are combined to generate a multi-icon, the default screen can be a screen divided by 1:1:1 in a horizontal direction, and the icons are set to be displayed from left to right on the basis of the selection order of the icons. Further, when four icons are combined to generate a multi-icon, the default screen can be a screen divided by 1:1 a horizontal direction and by 1:1 in a vertical direction, and the icons are set to be displayed at the upper left side, the upper right side, the lower left side, and the lower right side on the basis of the selection order of the icons. These are merely examples, and the present disclosure is not limited thereto.

The storage unit 120 stores applications that are simultaneously executable, and may store a multi-application operation program which controls a multi-screen display of a plurality of applications which are simultaneously executed. The multi-application operation program may include a routine for controlling generation of a multi-icon,

TABLE 1

| Name | Stored location of multi-icon | Stored location of application | Screen division information |
|---|---|---|---|
| Internet TV | C:\icon\Internet TV.*** | C:\app\Webbrowser.xxx C:\app\DMB.xxx | Width 1 (web browser): 1(DMB) |
| Text TV | C:\icon\text TV.*** | C:\app\text message.xxx C:\app\DMB.xxx | Length 2 (text message): 1(DMB) |
| Text Internet TV | C:\icon\text Internet TV.*** | C:\app\text message.xxx C:\app\Webbrowser.xxx C:\app\DMB.xxx | Width 1 (length 1(text message): 2 (web browser)): 1(DMB) |
| . | . | . | . |
| . | . | . | . |
| . | . | . | . |

Referring to Table 1 above, the multi-icon DB 121 may include the name of the multi-icon, the stored location of the multi-icon, the stored location of the mapped application, and the screen division information. For example, when the multi-icon named "Internet TV" is selected by the user, a web browser application and a Digital Multimedia Broada routine for managing editing of the multi-icon, a routine for managing execution of the multi-icon, and a routine for managing the update of the multi-icon.

The routine for controlling generation of the multi-icon may generate the multi-icon by combining at least two icons which are selected in the multi-icon generation mode. This routine may generate the multi-icon by combining the selected at least two icons and appropriately reducing the size of the combined icon to be substantially the same size as a normally displayed icon, or by appropriately reducing the selected at least two icons and then combining the reduced icons. Further, the routine of controlling generation of the multi-icon may respectively cut part of at least two icons and generate the multi-icon by attaching the cut icons. Here, the locations of respective icons which constitute the multi-icon correspond to the locations where the applications are displayed on the multi-screen, which will be described in detail later with reference to FIGS. 3A to 4. Further, the routine of controlling generation of the multi-icon may map the application corresponding to the selected at least two icons to the generated multi-icon.

The routine for controlling editing of the multi-icon controls the procedure of changing screen division information of the multi-icon (displayed location of each application and the size of each divided screen) at the editing mode of the multi-icon. When the editing is completed, this routine may control the multi-icon to be updated by transmitting the changed screen division information to the routine for controlling generation of the multi-icon, which will be described in detail later with reference to FIG. 5.

Figure 6A:
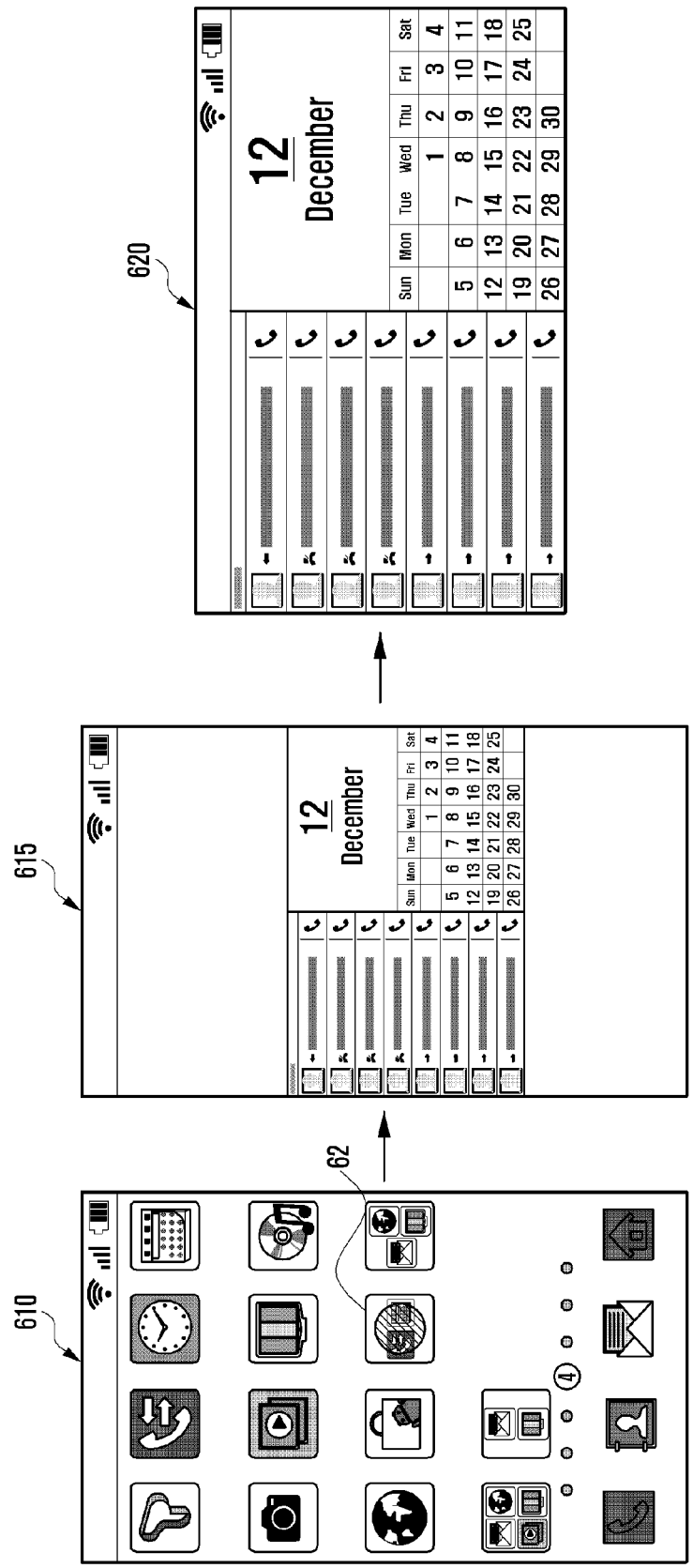
FIG. 6A illustrates an example of executing a multi-icon according to an embodiment of the present disclosure.
Figure 6C:
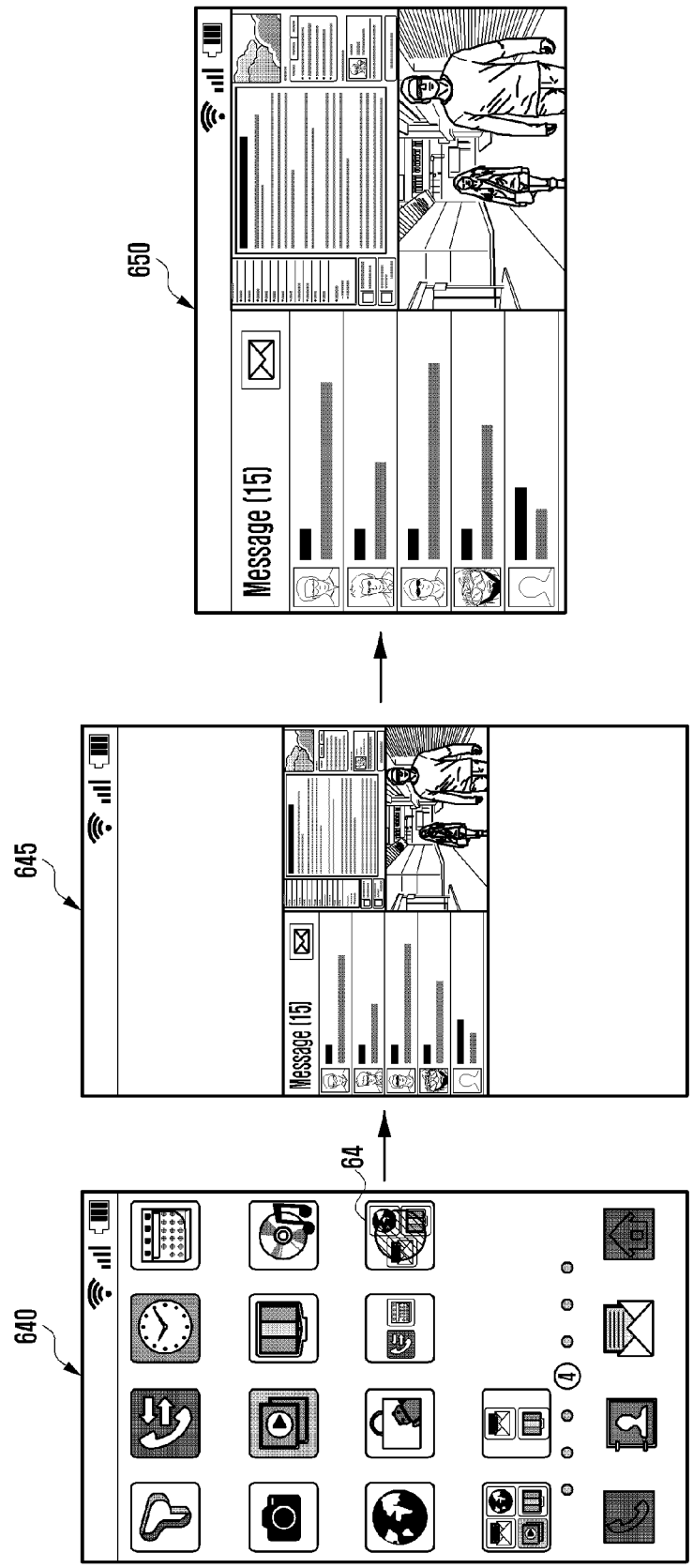
FIG. 6C illustrates an example of executing a multi-icon according to an embodiment of the present disclosure.

When execution of a specific multi-icon is requested (e.g., the multi-icon is touched) in the icon display screen (e.g., a home screen, a menu screen, etc.) including at least one multi-icon, the routine for managing execution of the multi-icon may control the display panel 131 to form the multi-screen according to the screen division information which is mapped to the specific multi-icon, and control to respectively display a plurality of applications mapped to the multi-icon on the formed multi-screen, which will be described in detail later with reference to FIGS. 6A to 6C.

When the state where the multi-icon has been executed, i.e., the screen division information in the multi-screen (the size and display location of the divided screen) is changed, the routine for controlling the update of the multi-icon may transmit the changed screen division information to the routine for controlling generation of the multi-icon to update the multi-icon, which will be described in detail later with reference to FIGS. 7 and 8.

The controller 110 may control the overall operation of the portable device 100 and a signal flow between internal blocks of the portable device 100, and perform a data processing function. For example, the controller 110 may be formed as a central processing unit (CPU), an application processor, etc. The controller 110 may be formed as a single core processor or a multi-core processor.

The controller 110 may control the multi-application operation procedure. That is, the controller 110 may control the multi-screen display on a plurality of applications which are simultaneously executed through selection of the multi-icon. To this end, the controller 110 may include the multi-icon management unit 111 and the multi-screen controller 112.

The multi-icon management unit 111 may manage generation, editing and an update of the multi-icon. The multi-icon management unit 111 may generate the multi-icon by combining at least two selected icons and appropriately reducing the size of a combined icon to be the same as that of normally displayed icons, or by appropriately reducing the selected at least two icons and then combining the reduced icons. Further, the multi-icon management unit 111 may generate the multi-icon by respectively cutting part of the selected at least two icons and combining the cut icons. The multi-icon management unit 111 may generate a multi-icon based on the default screen division information according to the number of selected icons. That is, when the multi-icon is generated, the multi-icon management unit 111 may set the screen division so that the execution images of a plurality of applications have the same screen size and the displayed location is determined on the basis of the selected order. As such, the present disclosure allows easy prediction of the form of the multi-screen when the multi-icon is executed.

When the screen division information mapped to the multi-icon by the editing or the update of the multi-icon is changed, the multi-icon management unit 111 may change the size and location of icons which form the multi-icon to correspond to the changed screen division information.

The multi-screen controller 112 may control the display of the multi-screen display according to execution of the multi-icon. That is, when the multi-icon is executed, the multi-screen controller 112 may control the display panel 131 to respectively display execution screens of a plurality of applications at corresponding locations after checking the screen division information mapped to the executed multi-icon, and dividing the screen according to the screen division information. When the screen division information is changed on the multi-screen, the multi-screen controller 112 may provide the changed screen division information to the multi-icon management unit 111 to update the multi-icon.

Further operations of controller 110 which performs the above-described functions will be described in detail later with reference to FIGS. 2 to 8.

Moreover, although not illustrated in FIG. 1, the portable device 100 may further selectively include additional components having additional functions such as a global positioning system (GPS) module for receiving location information, a broadcast receiving module for receiving a broadcast, a digital sound source replay module such as an MP3 module, and an Internet communication module (e.g., Wi-Fi communication module). Such additional components may be variously modified according to the trend of digital convergence. Portable device 100 according to the present disclosure may further include other components of similar nature as that of the above-mentioned components.

Figure 2:
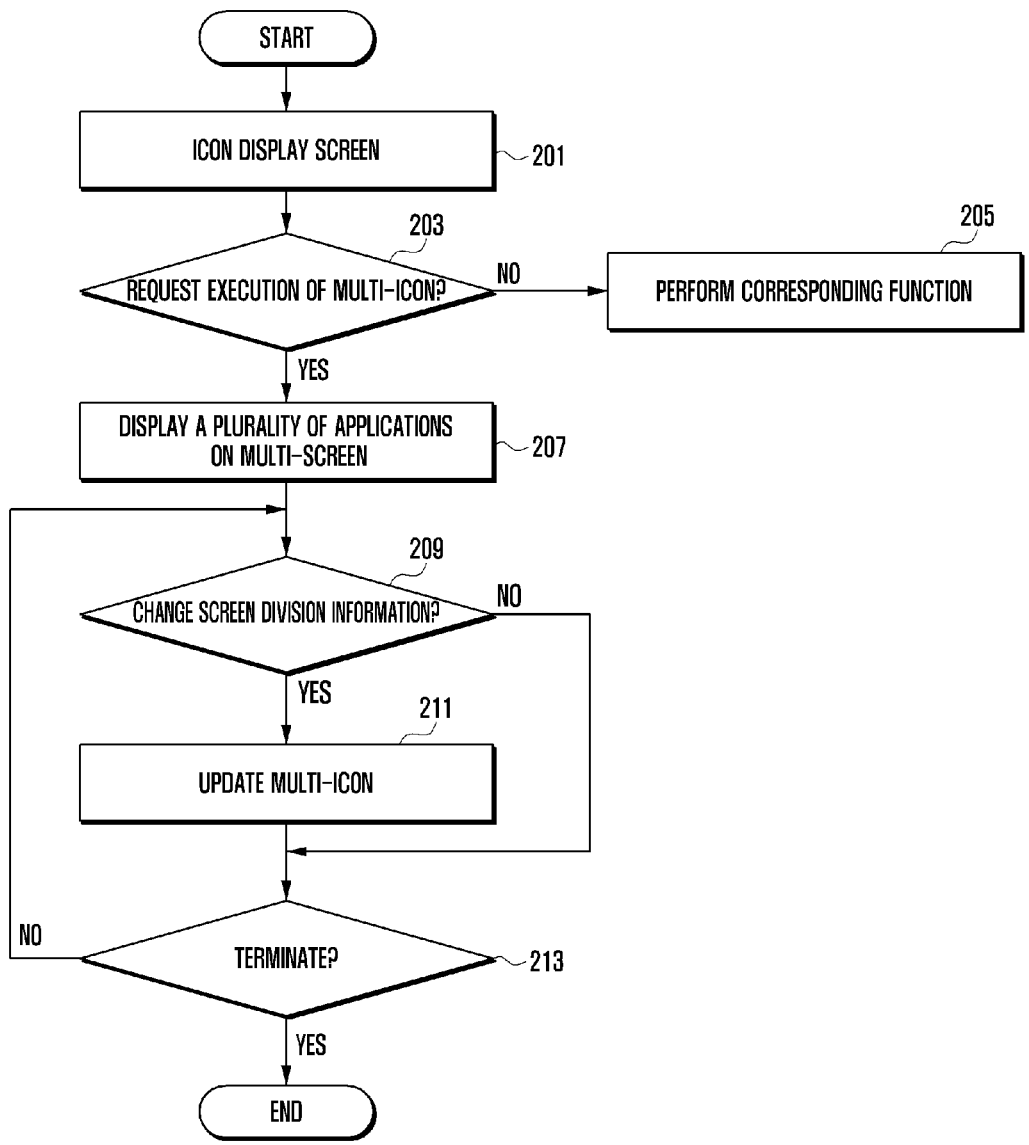
FIG. 2 is a flowchart illustrating a method of operating a multi-application of a portable terminal according to an embodiment of the present disclosure.

FIG. 2 is a flowchart illustrating a method of operating a multi-application of a portable device according to an embodiment of the present disclosure. The various operations to be described are performed under the controller of controller 110, and images are displayed on display panel 131 as mentioned above.

At the outset of the exemplary method, an icon display screen including at least one multi-icon is displayed (operation 201). The icon display screen may be a home screen, a menu screen, a wallpaper screen, etc.

Next, the method determines whether the execution of the multi-icon is requested (operation 203), via detection of a predetermined input. For example, the controller 110 may determine whether the multi-icon is touched. Further, the controller 110 may determine whether the multi-icon is executed (e.g., a double click) through a pointing device such as a mouse. However, the present disclosure is not limited thereto, and the multi-icon may be executed in various other predetermined ways.

At operation 203, when the execution of the multi-icon is not requested, a corresponding function is performed (operation 205). For example, a music replay function, an Internet connection function, a photographing function, etc. may be performed according to the user's request. Further, the function of generating or editing the multi-icon may be performed, which will be described in detail later with reference to FIGS. 3A to 5.

When the execution of the multi-icon is requested at operation 203, a plurality of applications are launched and their respective images are displayed (operation 207) by using the multi-screen. In detail, the overall screen is divided according to the screen division information mapped to the execution-requested multi-icon, and execution screens of the plurality of applications are respectively displayed in divided portions of the divided screen.

Thereafter, the method determines whether the screen division information is changed from a default configuration (operation 209). Such changes may be implemented via predefined user input commands. The controller 110 may determine whether at least one of the displayed locations of applications and the sizes of respective divided screens is changed, which will be described in detail later with reference to FIG. 7.

If the screen division information is changed at operation 209, the flow proceeds to operation 211 where screen division information is updated. In detail, the controller 110 may change the sizes and locations of the icons included in the multi-icon by reflecting the changed screen division information. (If the screen division information is not changed at 209, the flow proceeds to 213.)

After the multi-icon update, the process determines whether the termination signal inputted at operation 213. If not, the above-described process is repeated by returning to operation 209. When the termination signal is inputted at operation 213, the controller 110 may terminate the multi-screen and return to the icon-display screen.

Further, according to another embodiment of the present disclosure, when the termination of the multi-screen is requested, the screen division information mapped to the multi-icon is compared with the screen division information at the time point when the termination has been requested, so as to determine whether the screen division information has been changed. When the screen division information has been changed, the multi-icon may be controlled to be updated. This is because it is inefficient to update the multi-icon whenever the screen division information is changed.

Figure 3A:
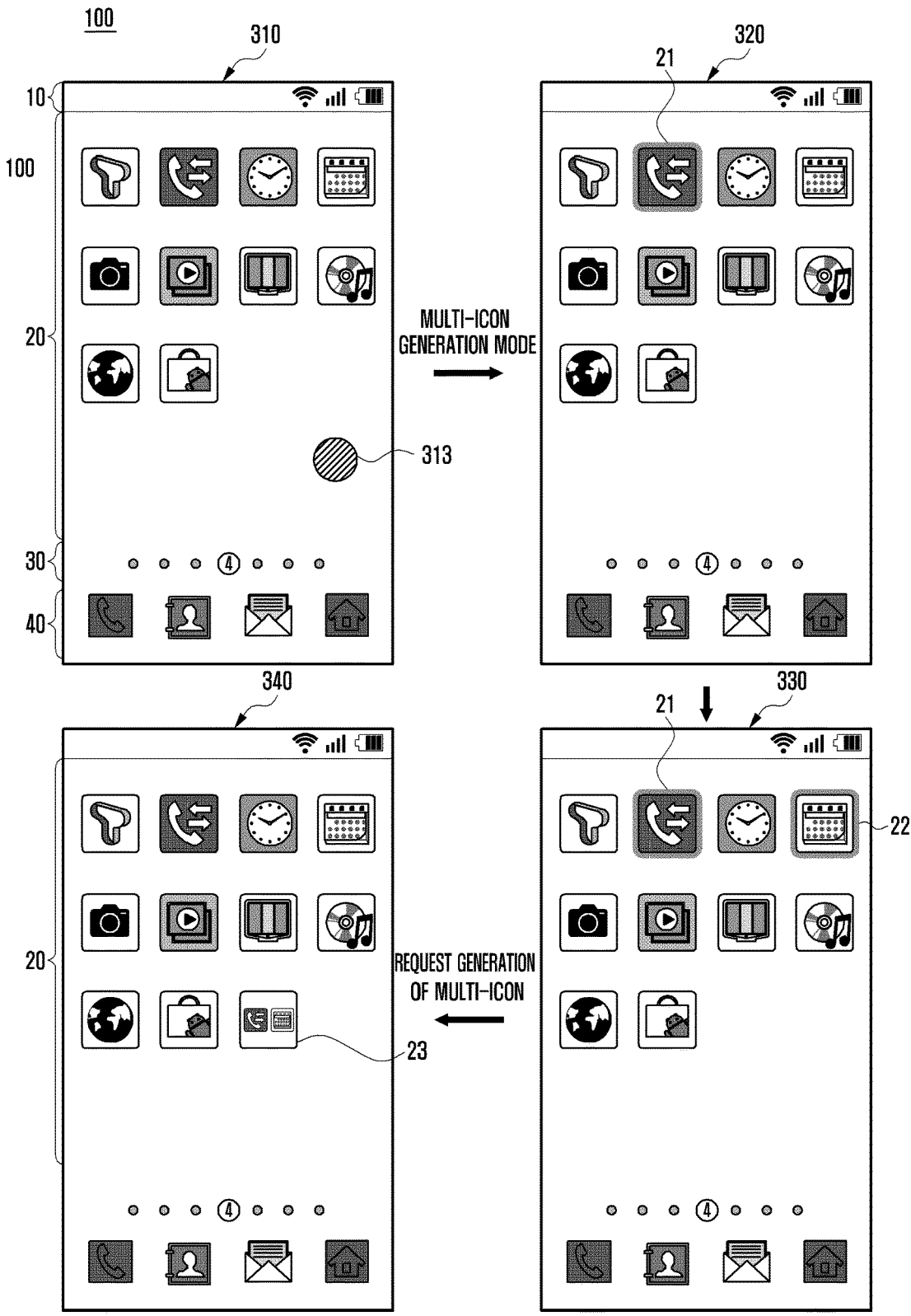
FIG. 3A, FIG. 3B and FIG. 3C illustrate a method of generating a multi-icon according to an embodiment of the present disclosure.
Figure 3B:
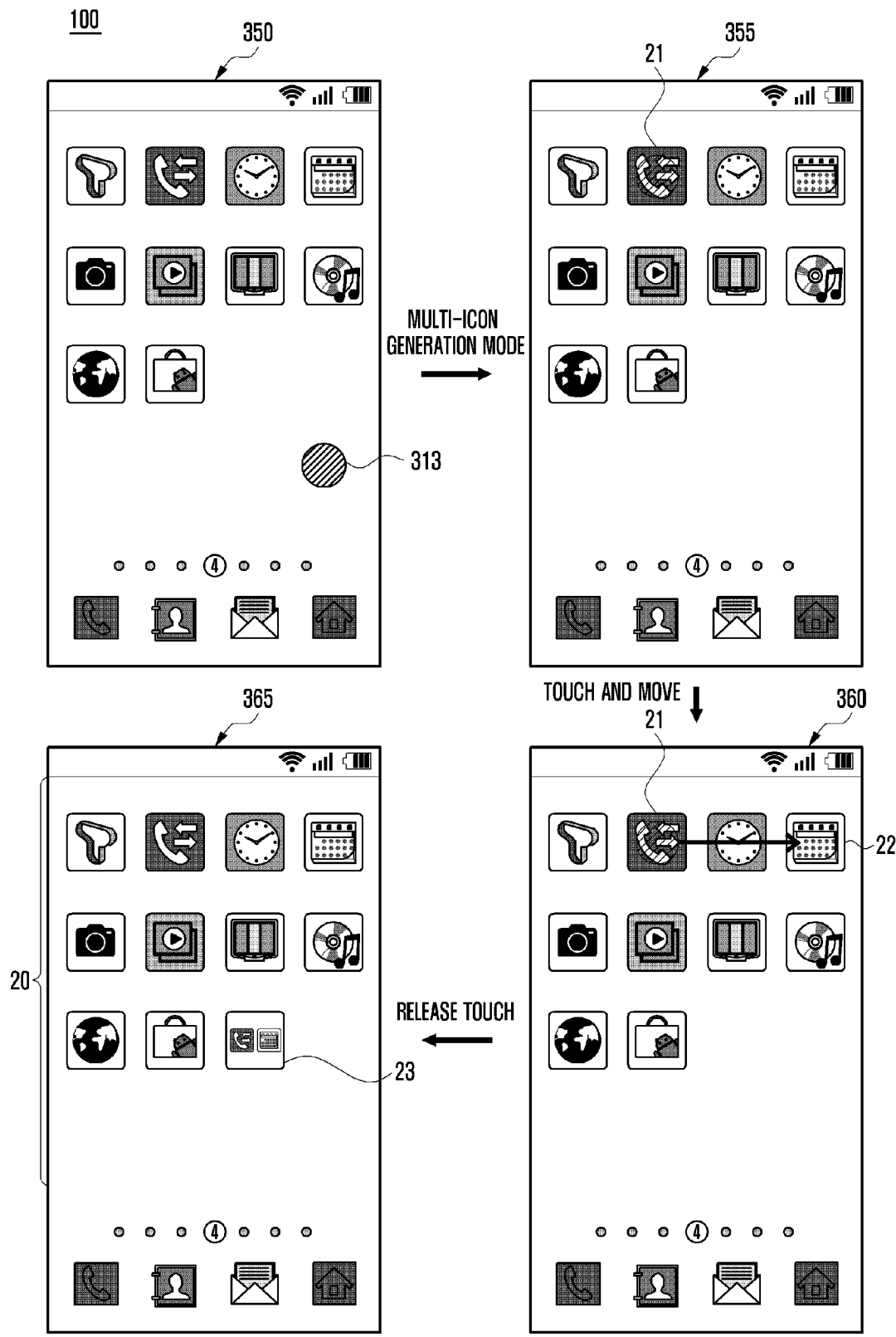
Figure 3C:
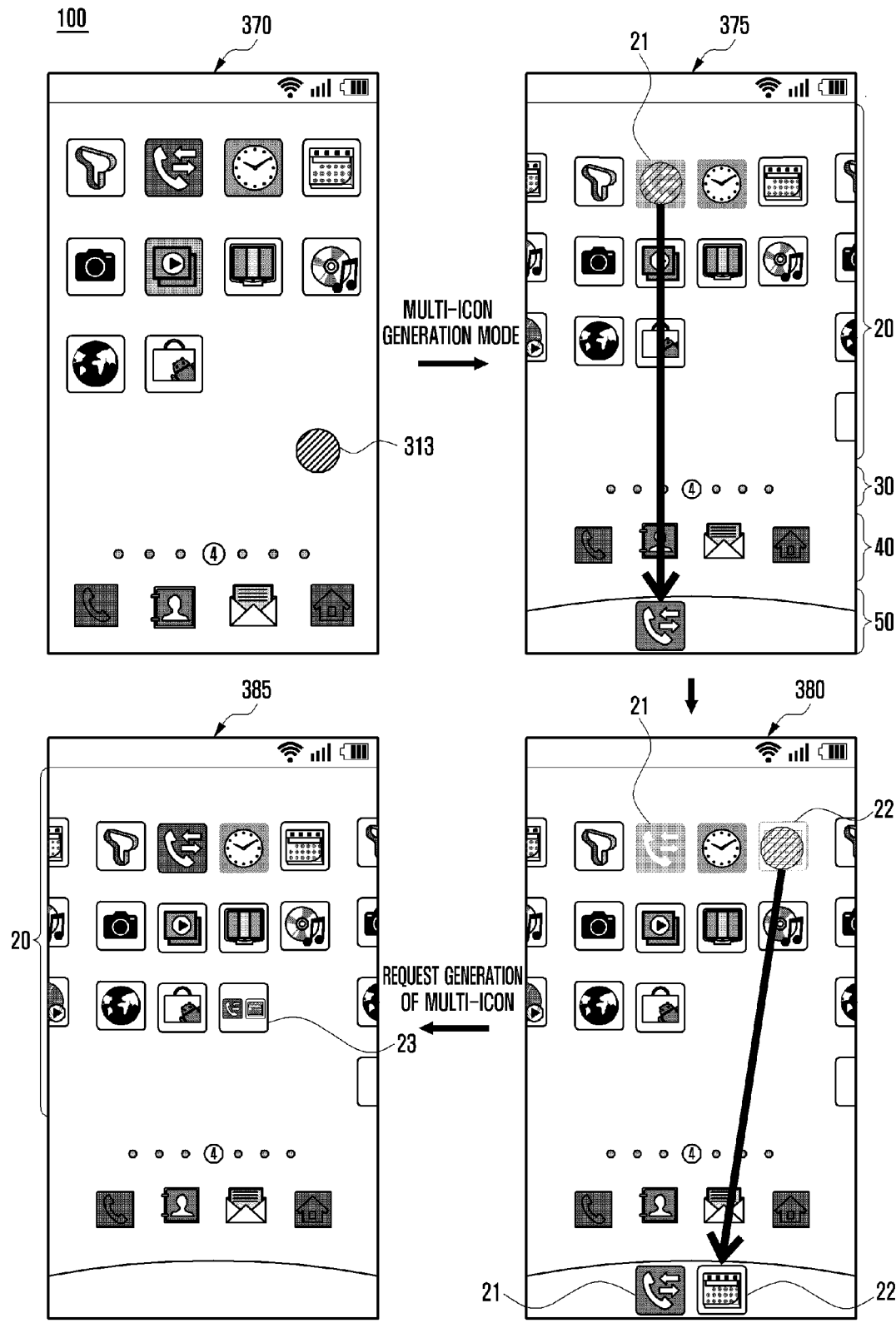

FIGS. 3A to 3C depict example screens for illustrating a method of generating a multi-icon according to an embodiment of the present disclosure.

Referring to FIG. 3A, the touch screen 130 of the portable device 100 according to the present disclosure may output an icon display screen including a plurality of icons. For example, the touch screen 130 may output a home screen 310 including a plurality of icons. The home screen 310 may include an indicator area 10 which displays a battery remainder, a received signal intensity, etc., an icon area 20 in which icons are displayed in multiple rows and columns, with pages (sets) of icons horizontally scrollable, a page information area 30 which displays the page information that forms the home screen, and a docking area 40 where fixed icons are displayed at the same location regardless of the page movement. Referring to the page information area 30, the example home screen 310 is composed of a total of seven pages, and currently page 4 is being displayed. Further, FIG. 3A illustrates only icons, but the name of the icon may also be displayed directly beneath each icon.

When a signal that requests activation of the multi-icon generation mode is inputted, such as a signal due to a predetermined touch gesture 313, the controller 110 may control the touch screen 130 to output a screen for generating (creating) a multi-icon as shown in example screen 320. The multi-icon generation mode may be activated through a predetermined touch interaction (e.g., a long touch 313 on an empty area of the home screen). Further, in the example screen 320, the multi-icon generation screen is illustrated as in the home screen, but the present disclosure is not limited thereto. That is, the controller 110 may display the multi-icon generation screen in a manner that is distinguished from the home screen. For example, the controller 110 may change the background color or the screen user interface (UI) to be displayed.

In the multi-icon generation screen, the user may select at least two icons for inclusion in a multi-icon. For example, as illustrated in example screens 320 and 330, the user may first touch a calling icon 21 and then touch a calendar icon 22. The controller 110 detects the touches and may control the touch screen 130 to highlight and display the calling icon 21 and the calendar icon 22 to indicate that the icon has been selected. In this state, if another touch of the highlighted icon (a calling icon 21 or a calendar icon 22) is sensed, the controller 110 may cancel selection. That is, the controller 110 may remove the highlight.

In the state as in example screen 330, when a multi-icon generation signal is inputted, the controller 110 may generate a multi-icon 23 by combining replicated versions of the selected calling icon 21 and calendar icon 22. (Note that the original icons 21 and 22 preferably remain unchanged even though a new combined icon 23 is formed, as shown in example screen 340). The multi-icon generation signal may be inputted through a menu, a predetermined function key, a predetermined touch gesture, etc.

If the generation of the multi-icon 23 is completed, the controller 110 may control the touch screen 130 to display the generated multi-icon 23 in an empty space of the item display area 20 as illustrated in example screen 340. If, however, there is no empty space in the current page (page 4), the controller 110 may display the generated multi-icon 23 on a page where an empty space exists among previous or following pages. In forming the images (sub-icons) of the multi-icon 23, the controller 110 may map the generated multi-icon 23 to the default screen division information according to the number of the selected icons and a plurality of applications corresponding to the selected icons.

Further, although not illustrated in FIG. 3A, when three icons are intended to be combined, the user may select three icons and request generation of a multi-icon of three icons. Further, the user may request generation of the multi-icon of three icons after already forming a multi-icon of two icons. That is, after forming a multi-icon by combining two icons, one additional icon may be added via subsequent operation. Likewise, the user may generate a multi-icon which is generated by combining four or more icons.

Further, after the multi-icon 23 is generated, the controller 110 may display a pop-up window (not shown) to facilitate editing of the multi-icon, at one side of the touch screen 130. As such, an embodiment of the present disclosure may first generate the multi-icon and thereafter allow the user to promptly set the screen division information of the generated multi-icon. At this time, when the user chooses not to perform the editing of the multi-icon, the controller 110 maps the default screen division information to the generated multi-icon.

Further, the controller 110 may generate the name of the generated multi-icon by combining first characters of the names of the selected icons. Further, the controller 110 may generate the name of the multi-icon by combining the names of the selected icons into one name. Further, the controller 110 may generate the multi-icon 23 and then display a pop-up window for receiving an input of the name of the generated multi-icon, on one side of the touch screen 130.

FIG. 3B depicts screen examples for illustrating a method of generating another multi-icon according to another example. Hereinafter, description of operations already described in connection with FIG. 3A, will be omitted.

Referring to FIG. 3B, the touch screen 130 of the portable device 100 according to the present disclosure may output a home screen 350 including a plurality of icons. Thereafter, when a signal that requests activation of the multi-icon generation mode is inputted, e.g., in response to touch input 313, the controller 110 may control the touch screen 130 to output the multi-icon generation screen as illustrated in example screen 355.

In the multi-icon generation screen, the user may generate the multi-icon by dragging and dropping the first icon to the second icon. For example, as illustrated in example screens 355 and 360, the user may touch the calling icon 21 and then drag the touch to the location where the calendar icon 22 is displayed.

In the state as in example screen 360, if a touch release signal is inputted, the controller 110 may generate a multi-icon 23 by combining the calling icon 21 and the calendar icon 22. Further, if the touch release signal is inputted, the controller 110 may output a pop-up window (not shown) asking whether the multi-icon is intended to be generated, and if generation of the multi-icon is requested through the pop-up window, the multi-icon 23 may generated.

If the generation of the multi-icon 23 is completed, the controller 110 may control the touch screen 130 to display the generated multi-icon 23 in an empty space of the item display area 20 as illustrated in screen 365.

Further, when the multi-icon is generated by combining three icons, the user may generate a multi-icon by dragging and dropping the first icon to the second icon, and then drag and drop the generated multi-icon to the third icon or drag and drop the third icon to the generated multi-icon. Likewise, the user may generate the multi-icon by combining four or more icons. For example, the user may generate the multi-icon including four icons by combining two multi-icons that each contain two icons.

FIG. 3C illustrates a method of generating a multi-icon according to another embodiment of the present disclosure. For brevity, description of operations which have been described with reference to FIGS. 3A and 3B will be omitted.

Referring to FIG. 3C, the touch screen 130 of the portable device 100 according to the present disclosure may output a home screen 370 including a plurality of icons. Thereafter, when a signal which requests activation of the multi-icon generation mode is inputted (e.g., due to touch input 313), the controller 110 may control the touch screen 130 to output the multi-icon generation screen as illustrated by screen 375. The multi-icon generation screen 375 according to this embodiment differs from the home screen 370. In detail, the icon area 20, the page information area 30, and the docking area 40 may be reduced, and the icon storing area 50 for temporarily storing icons for generating the multi-icon may be displayed on the lower end of the screen.

In the multi-icon generation screen 375, the user may move at least two icons for generating the multi-icon to the icon storing area 50. For example, as illustrated in example screens 375 and 380, the user may touch and drag the calling icon 21 and the calendar icon 22 to the icon-storing area 50. At this time, the controller 110 may control the calling icon 21 and the calendar icon 22 of the icon area 20 to be displayed differently from other icons in order to indicate that the calling icon 21 and the calendar icon 22 have already been selected. For example, the calling icon 21 and the calendar icon 22 of the icon area 20 may be blurred.

In the state as in example screen 380, if the multi-icon generation signal is inputted, the controller 110 may generate the multi-icon 23 by combining the calling icon 21 and the calendar icon 22. If the generation of the multi-icon 23 is completed, the controller 110 may control the touch screen 130 to display the multi-icon 23 which is generated in the empty space of the icon area 20 as illustrated in example screen 385.

Further, when a multi-icon is generated by combining three icons, the user may move the three icons to the icon-storing area 50 and then request generation of the multi-icon, or move one common icon and a multi-icon, which is generated by combining two icons, to the icon-storing area 50 and then request generation of a multi-icon. Similarly, the user may generate a multi-icon by combining four or more icons.

Further, a case of generating a multi-icon in a screen of displaying an icon (e.g., a home screen, a menu screen, etc.) has been described above. However, the present disclosure is not limited thereto. For example, when a multi-icon generation signal is inputted in a state in which a plurality of applications are executed by using a multi-screen according to the existing method, the controller 110 may generate a multi-icon based on the screen division information of the multi-screen.

Figure 4:
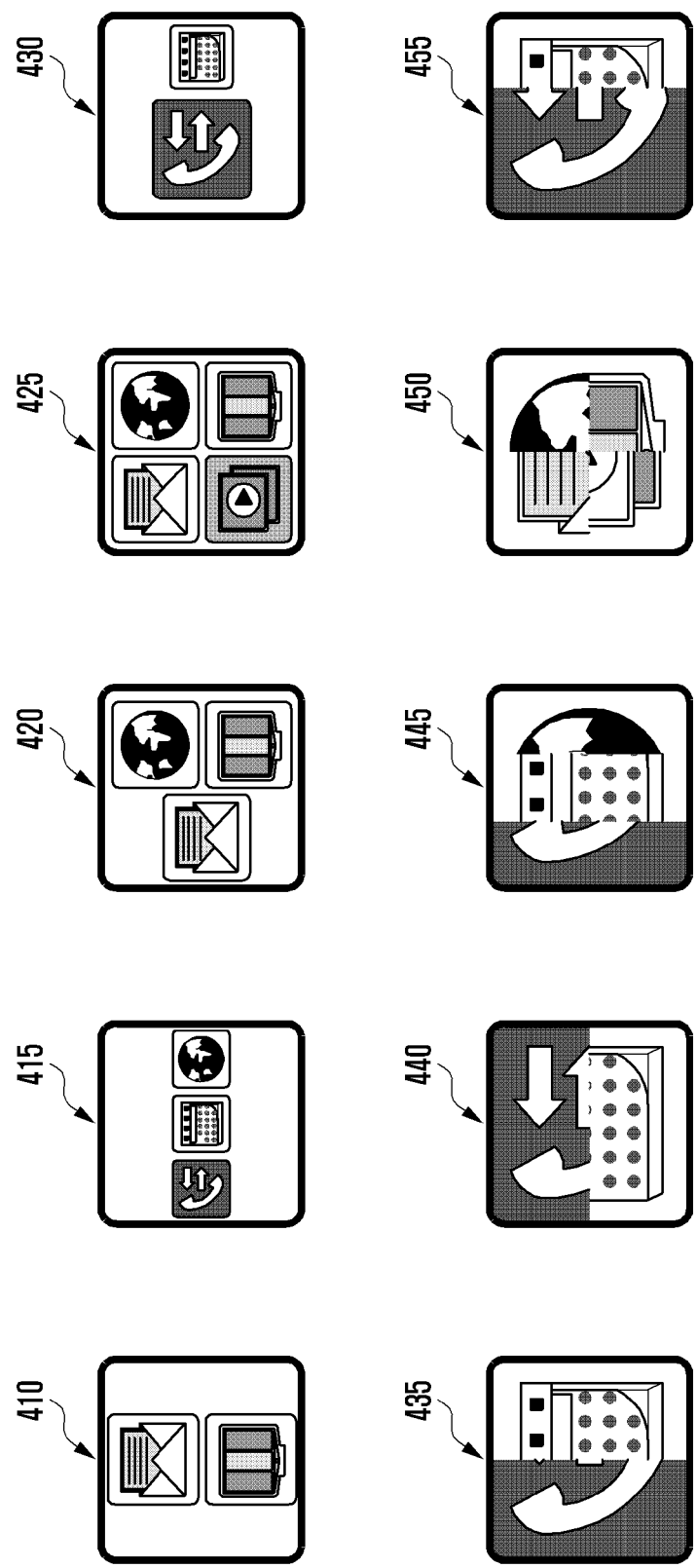
FIG. 4 illustrates various forms of a multi-icon according to an embodiment of the present disclosure.

FIG. 4 illustrates various forms of a multi-icon according to various embodiments of the present disclosure. As shown, multi-icons according to various embodiments can have the same size as that of a common icon, and may be formed by combining a plurality of icons. In detail, the multi-icon may be formed by reducing a plurality of icons as in the multi-icons of reference numerals 410 to 430 and arranging the reduced icons (also referred to as "sub-icons" of the multi-icon) according to the screen division information. Further, as illustrated by multi-icons 435 to 455, a multi-icon may have an appearance as a plurality of icons that are appear to be cut, where the cut icons appear combined according to the screen division information. Likewise, according to the present disclosure, a plurality of applications may be executed at the same time through selection of the multi-icon (e.g., a predetermined touch gesture on the multi-icon, such as a single tap thereon). The user may recognize the configuration of a multi-screen to be generated upon selecting the multi-icon, prior to generation of the multi-screen, by viewing the arrangement of sub-icons in the multi-icon.

For example, referring to multi-icon 410, the text message application is mapped to the TV application. When multi-icon 410 is selected (for execution), the screen is vertically divided in two equal sized divisions, the text message screen is displayed on the divided screen of the upper end, and the TV screen is displayed on the divided screen of the lower end.

As another example, referring to the multi-icon 415, the calling application, the calendar application, and the web browser application are displayed on a multi-screen which is horizontally divided by three equal parts from a left side to a right side.

As another example, referring to the multi-icon 420, the text message application, the web browser application, and the TV application are displayed on the multi-screen which is horizontally divided by 1:1 and then the right side of the divided screen is vertically divided by 1:1.

As another example, referring to the multi-icon 425, the text message application, the web browser application, the video replay application, and the TV application are displayed on a multi-screen, which is horizontally and vertically divided to form four parts of the same size, from the upper left side to the lower right side.

As another example, referring to the multi-icon 430, the calling application is displayed on the left side of the unequally, horizontally, divided multi-screen, and the calendar application is displayed on the right side in a smaller size.

Further, the multi-icons 435, 440, 445, 450, and 455 are similar to the multi-icons 410 to 430 except that the former icons have the appearance of being partly cut and/or blended together. Multi-screen generation upon selection of multi-icons 435 to 455 is similar to that described above for multi-icons 410 to 430.

FIG. 5 illustrates an example of a method of editing a multi-icon according to an embodiment of the present disclosure. When a signal which requests activation of the editing mode of the multi-icon is inputted, a multi-icon editing screen is displayed. For example, when the first multi-icon 51, where the calling application is mapped to the calendar application, is long-touched on the home screen 510, the controller 110 may control the touch screen 130 to display the multi-icon editing screen as in example screens 515 and 530. Here, the present disclosure is not limited to activating the multi-icon editing mode through a long touch. That is, in other embodiments, various touch interactions may be used to request activation of the multi-icon editing mode. Further, when a signal, which requests activation of the multi-icon editing mode, is inputted, the controller 110 according to another embodiment of the present disclosure may control to output the multi-icon list screen including only multi-icons, and if a specific multi-icon is selected (touched) in the multi-icon list screen, the controller 110 may control the touch screen 130 to output the editing screen of the selected specific multi-icon.

In the state in which the editing screen of the first multi-icon 51 is outputted, the user may change the size and location of the divided screens which constitute the multi-screen. For example, as illustrated in the example screens 515 and 520, the user may increase the horizontal size of the first divided screen 52 and reduce the horizontal size of the second divided screen 53 by touching the border line 54 between the first divided screen 52 and the second divided screen 53 and dragging the touch in the right direction. At this time, the controller 110 may reduce the vertical size in proportion to the reduction of the horizontal size of the second divided screen 53 to maintain the horizontal and vertical ratio of the screen of the calendar application. Further, when the mode of the portable device 100 is changed to the horizontal mode as in the example screen 525, the controller 110 may rotate the multi-screen and resize the multi-screen to adjust to the horizontal mode. When the editing mode of the multi-icon is terminated in the state as in screens 520 and 525, the controller 110 may update the first multi-icon 51. For example, the first multi-icon 51 may be changed to the multi-icon 430 of FIG. 4.

Further, as illustrated in the screens 530 and 535, if the user touches the first divided screen 52 and moves to the second divided screen 53, the controller 110 may exchange the location of the first divided screen 52 with the location of the second divided screen 53. Further, as illustrated in the example screen 540, if the mode of the portable device 100 is changed to the horizontal mode, the controller 110 may control to rotate the multi-screen and resize the multi-screen to adjust to the horizontal mode. If the editing mode of the multi-icon is terminated in a state as in the screens 535 and 540, the controller 110 may update the first multi-icon 51.

In other words, if the editing of the screen division information of the multi-icon is completed through the above-described method, the controller 110 may change the sizes and locations of icons which form the multi-icon according to the edited screen division information.

FIGS. 6A to 6C illustrate an example of executing a multi-icon according to an embodiment of the present disclosure. Herein, "executing a multi-icon" refers to selecting a multi-icon in a manner that causes executing the applications (e.g., initially launching the applications) of the multi-icon in a multi-screen display mode according to the characteristics of the multi-icon.

First, referring to FIG. 6A, a home screen 610 is output, which includes a multi-icon and a common icon. If the second multi-icon 62 is touched in the home screen 610, the controller 110 may display the execution screen of the calling application and the calendar application, which are mapped to the second multi-icon 62, in the multi-screen which is divided according to the screen division information which is mapped to the second multi-icon 62, as illustrated in the screen example of reference numeral 615. That is, the controller 110 may control the touch screen 130 to display the execution screen of the calling application on the left side of the multi-screen which is horizontally divided into two equal parts, and to display the execution screen of the calendar application on the right side of the multi-screen. Thereafter, when the mode of the portable device 100 is changed to the horizontal mode, the controller 110 may control to rotate the multi-screen and resize the multi-screen to adjust to the horizontal mode as illustrated in the example screen 620.

Referring to FIG. 6B, the controller 110 according to an embodiment of the present disclosure may output the home screen 625 including a multi-icon and a common icon. When the third multi-icon 63 is touched in the home screen 625, the controller 110 may display the execution screen of the text message application and the TV application, which have been mapped to the third multi-icon 63, on the multi-screen which has been divided according to the screen division information which has been mapped to the third multi-icon 63 as illustrated in the screen 630. That is, the controller 110 may control the touch screen 130 to display the execution screen of the text message application on the upper part of the multi-screen which has been vertically divided into two equal parts, and to display the execution screen of the TV application on the lower part of the multi-screen. Thereafter, when the mode of the portable device 100 is changed to the horizontal mode, the controller 110 may control to rotate the multi-screen and resize the multi-screen to adjust to the horizontal mode as illustrated in the example screen 635.

Referring to FIG. 6C, the controller 110 according to an embodiment of the present disclosure may output a home screen 640 including a multi-icon and a common icon. When the fourth multi-icon 64 is touched on the home screen 640, the controller 110 may display the execution screen of the text message application, the web browser application, and the TV application, which are mapped to the fourth multi-icon 64, on the multi-screen which has been divided according to the screen division information which has been mapped to the fourth multi-icon 64, as illustrated in the screen 645. That is, the controller 110 may control the touch screen 130 to display the execution screen of the text message application on the left side of the multi-screen which is horizontally divided into two equal parts and in which the left side of the divided screen is vertically divided into two equal parts, to display the execution screen of the web browser application on the upper right side, and to display the execution screen of the TV application on the lower right side. Thereafter, when the mode of the portable device 100 is changed to the horizontal mode, the controller 110 may control to rotate the multi-screen and resize the multi-screen to adjust to the horizontal mode, as depicted in screen 650.

Further, it was illustrated in FIGS. 6A to 6C that the execution screen of each application is illustrated throughout each divided screen, but there may be an empty space according to the horizontal and vertical ratio of the execution screen of each application in other embodiments.

Figure 7:
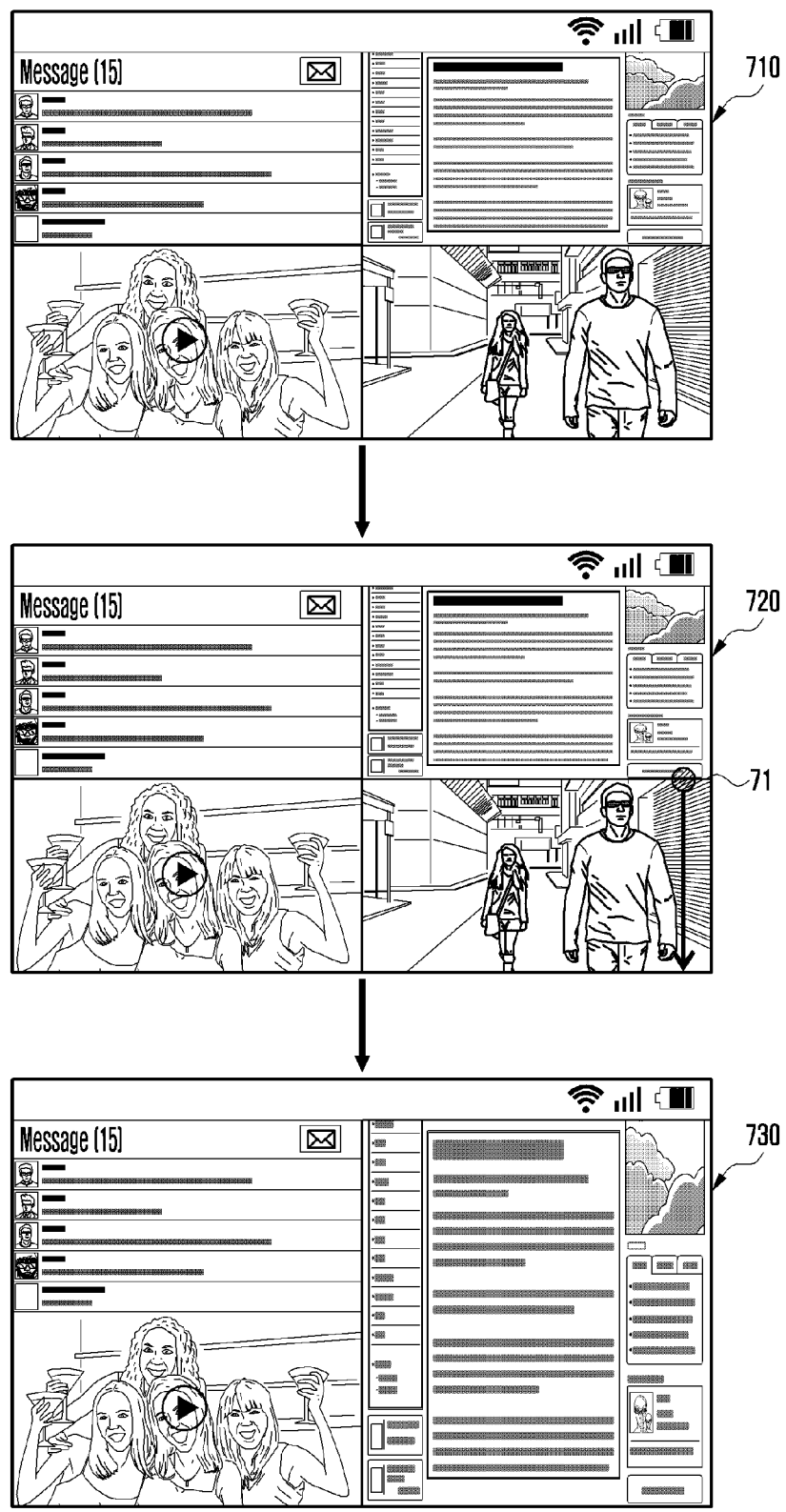
FIG. 7 illustrates a method of updating screen division information of a multi-icon according to an embodiment of the present disclosure.
Figure 8:
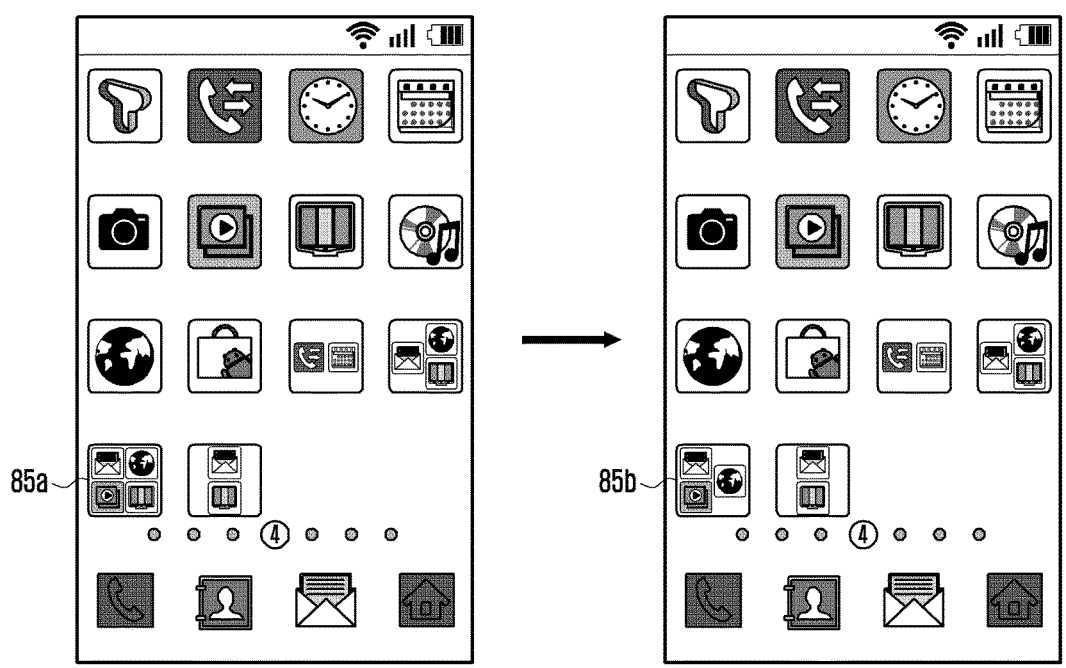
FIG. 8 illustrates a method of updating screen division information of a multi-icon according to an embodiment of the present disclosure.

FIGS. 7 and 8 illustrate a method of updating screen division information of a multi-icon according to an embodiment of the present disclosure.

Referring to FIGS. 7 and 8, the controller 110 according to an embodiment of the present disclosure may display the execution screen of a plurality of applications using the multi-screen as illustrated in example screen 710. For example, the multi-screen is horizontally and vertically divided into 4 equal parts, where the text message screen is displayed on the upper left side, the web page screen is displayed on the upper right side, the moving-image screen is displayed on the lower left side, and the TV screen is displayed on the lower right side, as illustrated in example screen 710.

In the state as in example screen 710, the user may change at least one of the size and location of each divided screen. For example, the user may touch the border line 71 between the web page screen and the TV screen, and drag the touch to the end of the lower side, as illustrated in example screen 720. In response, the controller 110 may remove the TV screen and display the web page screen on the entire right side area as illustrated in example screen example 730. In an embodiment, when the screen division information is changed in the execution screen of the multi-icon, the controller 110 may update the multi-icon in conjunction with the screen division change. Referring to FIG. 8, a fifth multi-icon 85a including four icons corresponding to the screen example of reference numeral 710 of FIG. 7 has been automatically updated to a sixth multi-icon 85b including three icons corresponding to the screen example of reference numeral 730 of FIG. 7.

Further, it was illustrated in FIG. 7 that the size of the divided screen is changed in the execution screen of the multi-icon. However, the location of the divided screen may be changed additionally or alternatively. For example, the location change mode may be activated in response to a predetermined user input(s), e.g., by long-touching one portion of the divided screen, whose location is to be changed, moving the screen image by dragging the touch to a desired location, and then releasing the touch. Likewise, if the location of the divided screen is changed in the execution screen of the multi-icon, the controller 110 may automatically update the multi-icon.

An embodiment of the present disclosure may be implemented in a program command form executable by various computer means and recorded in a computer readable recording medium. In this case, the computer readable recording medium may include a program command, a data file, and a data structure individually or a combination thereof. In the meantime, the program command recorded in a recording medium may be specially designed or configured for the present disclosure or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM, RAM, or flash memory for storing and executing program commands. Further, the program command includes a machine language code created by a compiler and a high-level language code executable by a computer using an interpreter. The foregoing hardware device may be configured to be operated according to at least one software module to perform an operation of the present disclosure.

As described above, a portable device and a method of operating a multi-application thereof according to an embodiment of the present disclosure may simultaneously execute a plurality of applications through provision of a multi-icon. Here, the simultaneously-executed applications are displayed as a multi-screen having a form which is set by the user. That is, the user of the portable device according to the present disclosure may easily execute a plurality of applications in a multi-screen of a previously-set form through selection of the multi-icon. Further, according to an embodiment of the present disclosure, a multi-icon is generated by combining icons of a plurality of applications which are frequently used by the user. In various embodiments, the size and location of a plurality of icons that form the multi-icon are determined according to the screen division information. Further, the multi-icon may be edited by the user. Further, the multi-icon may be automatically updated when the size and location of each divided screen is changed in a multi-screen which displays a plurality of executed applications. Hence, the user of the portable device according to certain embodiments may recognize the layout when a plurality of applications are executed through a multi-icon. As such, embodiments of the present disclosure may improve the user convenience.

Although exemplary embodiments of the present disclosure have been described in detail hereinabove, it should be clearly understood that many variations and modifications of the basic inventive concepts herein taught which may appear to those skilled in the present art will still fall within the spirit and scope of the present disclosure, as defined in the appended claims.

What is claimed is:

1. A method in a portable device, the method comprising:
   receiving an input event for selecting a multi-application icon displayed on a display;
   identifying each of a plurality of application, and screen division information of each of the plurality of applications, each of the plurality of applications mapped to the selected multi-application icon, the screen division information set according to user input;
   executing each identified application mapped to the selected multi-application icon so that respective windows of the plurality of applications are simultaneously displayed on the display at sizes that differ from one another, in accordance with the identified screen division information,
   wherein a size and a location of a first icon within the multi-application icon is changed to be larger than a size of a second icon included within the multi-application icon, to visually represent that corresponding windows of different sizes will be generated responsive to selection of the multi-application icon,
   in response to detecting a signal to activate a multi-application icon generation mode in a home screen including display of a plurality of icons, displaying an image indicating a multi-application icon generation area and maintaining display of all of the plurality of icons by reducing the plurality of icons in size; and detecting movement of at least two icons into the multi-application generation area; and responsive to receiving a multi-application generation signal, removing the multi-application icon area from display, restoring an original size of the plurality of icons, and displaying a new multi-application icon generated from combination of the at least two icons.

2. The method of claim 1, wherein the screen division information includes location information of each application to generate an image to be displayed at each of the respective windows, where the windows form an overall multi-screen.

3. The method of claim 2, further comprising:
updating the multi-application icon to correspond to changed screen division information if the screen division information is changed through further user input on the multi-screen.

4. The method of claim 1, further comprising:
displaying a multi-application icon generation screen including a plurality of icons when a signal of activating a multi-application icon generation mode is inputted;
sensing selection of at least two icons in the multi-application icon generation screen;
identifying screen division information according to numbers of the selected at least two icons; and
generating a multi-application icon by mapping to the screen division information and combining the selected at least two icons when a multi-application icon generation signal is inputted.

5. The method of claim 1, further comprising:
displaying a multi-application icon generation screen when a signal of activating a multi-application icon generation mode is inputted; and
detecting touch on a first icon on the multi-application icon generation screen, detecting drag movement of the touch to a second icon, and generating a multi-application icon by combining the first icon and the second icon when the touch is released.

6. The method of claim 1, further comprising:
inputting, when a multi-application icon is generated, a name of the generated multi-application icon.

7. The method of claim 1, further comprising:
outputting a multi-application icon editing screen according to screen division information when editing of a specific multi-application icon is requested;
sensing a change of the screen division information which is mapped to the specific multi-application icon in the multi-application icon editing screen; and
reflecting the changed screen division information to the specific multi-application icon.

8. The method of claim 7, wherein changing the sizes and locations of at least the first icon or second icon included in the multi-application icon, such that the first icon is displayed at the larger size than the second icon corresponds to the changed screen division information.

9. A portable device comprising:
a touch screen to display at least one multi-application icon and to receive an input event for selecting a multi-application icon; and
a controller to:
identify each of a plurality of applications and screen division information of each of the plurality of applications, each of the plurality of applications mapped to the selected multi-application icon and the screen division information set according to user input;
execute each identified application mapped to the selected multi-application icon so that respective windows of the plurality of applications are simultaneously displayed on the touch screen at sizes that differ from one another, in accordance with the identified screen division information,
wherein a size and a location of a first icon within the multi-application icon is changed to be larger than a size of a second icon included within the multi-application icon, to visually represent that corresponding windows of different sizes will be generated responsive to selection of the multi-application icon;
in response to detecting a signal to activate a multi-application icon generation mode in a home screen including display of a plurality of icons, control the touch screen to display an image indicating a multi-application icon generation area and maintaining display of all of the plurality of icons by reducing the plurality of icons in size;
detect movement of at least two icons into the multi-application generation area; and
responsive to receiving a multi-application generation signal, remove the multi-application icon area from display, restore an original size of the plurality of icons, and control the touch screen to display a new multi-application icon generated from combination of the at least two icons.

10. The portable device of claim 9, wherein the screen division information includes location information of each application's execution image to be displayed at each of the respective windows, where the windows form an overall multi-screen.

11. The portable device of claim 10, wherein the controller updates the multi-application icon to correspond to changed screen division information if the screen division information is changed through further input on the multi-screen.

12. The portable device of claim 9, wherein the controller controls to display a multi-application icon generation screen including a plurality of icons when a signal of activating a multi-application icon generation mode is inputted, and identify screen division information according to numbers of selected at least two icons of the plurality of icons; and generate a multi-application icon by mapping to the screen division information and combining the selected at least two icons when a multi-application icon generation signal is inputted in a state in which the at least two icons have been selected.

13. The portable device of claim 9, wherein the controller controls to display a multi-application icon generation screen when a signal of activating a multi-application icon generation mode is inputted, and generate a multi-application icon by combining a first icon and a second icon when a touch is released after the first icon is touched and moved the second icon in the multi-application icon generation screen.

14. The portable device of claim 9, wherein the controller controls to generate a name of a generated multi-application icon by combining a name of a plurality of icons when generating the multi-application icon by combining the plurality of icons.

15. The portable device of claim 9, wherein the controller controls to display a pop-up window for inputting a name of the generated multi-application icon when the multi-application icon is generated by combining a plurality of icons.

16. The portable device of claim 9, wherein the controller controls to output a multi-application icon editing screen according to screen division information when editing of a specific multi-application icon is requested, and reflect a changed screen division information to the specific multi-application icon when screen division information, which is mapped to the specific multi-application icon in the multi-application icon editing screen, is changed.

17. The portable device of claim 16, wherein changing the sizes and locations of at least the first icon or the second icon included in the multi-application icon according to the changed screen division information, such that the first icon is displayed at the larger size than the second icon corresponds to the changed screen division information.

18. A non-transitory computer-readable recording medium having recorded a program for executing a method in a portable device, wherein the method comprises:
   receiving an input event for selecting a multi-application icon displayed on a display;
   identifying each of a plurality of applications, and screen division information of each of the plurality of applications, mapped to the selected multi-application icon, the screen division information having been set according to user input;
   executing each identified application mapped to the selected multi-application icon so that respective windows of the plurality of applications are simultaneously displayed on the display at sizes that differ from one another, in accordance with the identified screen division information;
   outputting a multi-application icon editing screen according to screen division information when editing of a specific multi-application icon is requested;
   sensing a change of the screen division information which is mapped to the specific multi-application icon in the multi-application icon editing screen;
   reflecting the changed screen division information to the specific multi-application icon,
   wherein the reflecting of the changed screen division information to the specific multi-application icon comprises: changing sizes and locations of at least first and second icons included in the multi-application icon, such that the first icon is displayed at a larger size than the second icon to visually represent that corresponding windows of different sizes will be generated when the multi-application icon is selected,
   in response to detecting a signal to activate a multi-application icon generation mode in a home screen including display of a plurality of icons, displaying an image indicating a multi-application icon generation area and maintaining display of all of the plurality of icons by reducing the plurality of icons in size;
   detecting movement of at least two icons into the multi-application generation area; and
   responsive to receiving a multi-application generation signal, removing the multi-application icon area from display, restoring an original size of the plurality of icons, and displaying a new multi-application icon generated from combination of the at least two icons.

* * * * *